(12) United States Patent
Stoops (10) Patent No.: US 12,398,781 B2
(45) Date of Patent: Aug. 26, 2025

(54) HOOK AND LOOP ROPE (71) Applicant: Kevin R. Stoops, Bucyrus, KS (US)

(72) Inventor: Kevin R. Stoops, Bucyrus, KS (US)

(*) Notice: Subject to any disclaimer, the term of this patent is extended or adjusted under 35 U.S.C. 154(b) by 0 days.

(21) Appl. No.: 18/109,245

(22) Filed: Feb. 13, 2023

(65) Prior Publication Data

US 2024/0003406 A1 Jan. 4, 2024

Related U.S. Application Data

(63) Continuation-in-part of application No. 29/706,885, filed on Sep. 24, 2019, now Pat. No. Des. 977,942.

(51) Int. Cl.
*F16G 11/10* (2006.01)
*A44B 13/00* (2006.01)

(52) U.S. Cl.
CPC .......... *F16G 11/10* (2013.01); *A44B 13/0058* (2013.01)

(58) Field of Classification Search
CPC ..... F16G 11/10; A44B 13/0058; A44B 18/00; A44B 18/0084; Y10T 24/2708; Y10T 24/14; Y10T 24/27; B65D 2313/02
See application file for complete search history.

(56) References Cited

U.S. PATENT DOCUMENTS

| 1,945,932 | A | | 2/1934 | Caley | |
|---|---|---|---|---|---|
| 3,913,178 | A | * | 10/1975 | Ballin | B65D 63/1018 24/30.5 R |
| 4,150,463 | A | * | 4/1979 | Brown | B65D 63/1018 24/30.5 P |
| 4,700,432 | A | * | 10/1987 | Fennell | B65D 63/16 604/179 |
| 4,815,172 | A | * | 3/1989 | Ward | A44B 18/00 D8/382 |
| 4,817,837 | A | * | 4/1989 | Grover | A63C 11/021 224/250 |

(Continued)

FOREIGN PATENT DOCUMENTS

CN 306568759 S 5/2021

OTHER PUBLICATIONS

"Examiner's Report Received for Canada International Design registration Application No. DM/213093, mailed on Aug. 30, 2023."

(Continued)

*Primary Examiner* — Jason W San
*Assistant Examiner* — Rowland Do
(74) *Attorney, Agent, or Firm* — Kutak Rock LLP; Brian L. Main (57) ABSTRACT

The hook and loop rope facilitates tying objects down without requiring a user to tie a knot in the rope. Instead, the user need only loop the rope through a tiedown (or structural equivalent) prior to engaging hooks of a first portion of the rope with loops of a second portion of the rope. In the rolled configuration, a plurality of hooks associated with a hook side of the rope engage with a plurality of loops associated with a loop side of the rope, thereby retaining the rope in the rolled configuration. The plurality of hooks are displaced from the plurality of loops to move the rope into an unrolled configuration. Then, in the tie-down configuration, a first portion of the rope overlaps a second portion, thereby preventing or otherwise inhibiting movement of the first portion relative to the second.

15 Claims, 12 Drawing Sheets

(56) References Cited

U.S. PATENT DOCUMENTS

| | | | | |
|---|---|---|---|---|
| 4,893,381 | A * | 1/1990 | Frankel | B65D 63/10 24/442 |
| 5,015,251 | A * | 5/1991 | Cherubini | A61B 17/132 24/442 |
| 5,048,158 | A * | 9/1991 | Koerner | A44B 18/00 D8/382 |
| 5,120,300 | A | 6/1992 | Shaw | |
| 5,167,050 | A * | 12/1992 | Korsen | B65D 63/10 24/442 |
| 5,168,603 | A * | 12/1992 | Reed | B65D 63/10 24/442 |
| 5,289,619 | A * | 3/1994 | Pileggi | B42D 3/10 24/17 AP |
| 5,460,308 | A * | 10/1995 | Hahn | A63C 11/025 224/257 |
| 5,548,871 | A * | 8/1996 | Trethewey | A44B 18/00 24/442 |
| 5,600,873 | A | 2/1997 | May | |
| 5,604,961 | A * | 2/1997 | Cole | B65D 63/10 24/442 |
| 5,669,253 | A | 9/1997 | Higgins | |
| 5,732,445 | A * | 3/1998 | Stodolka | A44B 18/00 24/306 |
| 5,752,682 | A * | 5/1998 | Anderson | H02G 3/26 248/68.1 |
| D398,878 | S | 9/1998 | Middleton, Sr. | |
| 5,802,676 | A * | 9/1998 | Tolan | F16L 3/233 24/30.5 P |
| D400,686 | S | 11/1998 | Hamerman | |
| D435,145 | S | 12/2000 | Lindsey | |
| 6,217,366 | B1 * | 4/2001 | Weisstock | H01R 13/6392 439/367 |
| 6,484,371 | B1 * | 11/2002 | Romanko | A44B 18/008 24/306 |
| 6,523,229 | B2 * | 2/2003 | Severson | B65D 63/1018 24/16 PB |
| D475,231 | S | 6/2003 | Briles | |
| 6,588,074 | B2 * | 7/2003 | Galkiewicz | A44B 18/0053 24/306 |
| 6,622,346 | B2 * | 9/2003 | Graham | B65D 63/1018 24/30.5 R |
| 6,701,580 | B1 * | 3/2004 | Bandyopadhyay | B65D 63/10 24/304 |
| D503,806 | S | 4/2005 | Williams | |
| D511,450 | S | 11/2005 | Seth | |
| D599,935 | S | 9/2009 | Van Klinken | |
| D603,301 | S | 11/2009 | Evans | |
| D615,303 | S | 5/2010 | Baron | |
| D674,431 | S | 1/2013 | Kim et al. | |
| 8,628,488 | B2 * | 1/2014 | Serola | A61H 1/00 2/338 |
| D720,203 | S | 12/2014 | Plato | |
| D725,458 | S | 3/2015 | Plato | |
| 9,339,086 | B2 * | 5/2016 | Hill | B60P 7/0823 |
| 9,340,340 | B2 * | 5/2016 | Beckman | B65D 63/1018 |
| D769,103 | S | 10/2016 | Loughlin et al. | |
| D783,207 | S | 4/2017 | Lindsey | |
| D788,540 | S | 6/2017 | Mock | |
| D800,535 | S | 10/2017 | Loughlin et al. | |
| D813,527 | S | 3/2018 | Orban et al. | |
| 9,936,679 | B2 * | 4/2018 | Roberdeaux | F16B 2/08 |
| D825,487 | S | 8/2018 | Munson | |
| D826,366 | S | 8/2018 | Van Popering | |
| D836,744 | S | 12/2018 | Hubbard | |
| D836,903 | S | 1/2019 | Lindsey | |
| D843,525 | S | 3/2019 | Karvandi | |
| D878,950 | S | 3/2020 | Ennis et al. | |
| D895,971 | S | 9/2020 | Lemaire | |
| 11,246,602 | B2 * | 2/2022 | Slishman | A61B 17/1322 |
| D977,942 | S | 2/2023 | Stoops | |
| 2003/0150087 | A1 * | 8/2003 | Dieterich | A44B 18/0084 24/306 |
| 2017/0334621 | A1 * | 11/2017 | Dietrich | B65D 63/1018 |
| 2020/0040964 | A1 * | 2/2020 | Foreman | B65D 63/109 |

OTHER PUBLICATIONS

"Subsequent Examination Report Received for Canada International Design registration Application No. DM/213093, mailed on Feb. 8, 2024."
"Corrected Notice of Allowability Received for Design U.S. Appl. No. 29/706,885, mailed on Dec. 7, 2022."
"Examiner's Report Received for Canada International Design registration Application No. DM/213093, mailed on Aug. 8, 2022."
"First Office Action Received for the Chinese Design Application No. 202030103112.6, Mailed on Nov. 23, 2020".
"Multipurpose Reusable Plant Tie Self-Adhesive Hook Loop Wrap for Garden Support Cables,https://www.amazon.com/ Multipurpose-Reusable-Self-Adhesive-Polyester-Organizer/dp/B08NTSVD93/, retrieved Sep. 6, 2022 (Year: 2022)".
"Multipurpose Reusable Plant Ties, Sears, https://www.sears.com/ murifical-ish09-m875991mn-multipurpose-reusable-plant-tie-self/p-A103404436, May 1, 2021 (Year: 2021)".
"Non-Final Office Action Received for Design U.S. Appl. No. 29/706,885, mailed on Feb. 14, 2022."
"Notice of Allowance Received for Design U.S. Appl. No. 29/706,885, Mailed on Sep. 22, 2022."
"Notice of Decision to Grant Received for Chinese design application No. 202030103112.6 mailed on Mar. 11, 2021."
"Notification of Refusal Received for Canada International Design registration Application No. DM/213093, mailed on Mar. 1, 2022."
"Notification of Refusal Received for Republic of Korea International Design registration Application No. DM/213093, mailed on Mar. 17, 2022."
"Notification of Refusal Received for Vietnam International Design registration Application No. DM/213093, mailed on Sep. 17, 2021."
"Office Action Received for the Chinese Design Application No. 202030103112.6, Mailed on Jun. 12, 2020".

* cited by examiner

HOOK AND LOOP ROPE

CROSS-REFERENCE TO RELATED APPLICATIONS

This application is a continuation-in-part application of U.S. Design patent application Ser. No. 29/706,885, filed Sep. 24, 2019, now U.S. Design Pat. No. D977,942, the entire disclosure of which is incorporated herein by reference.

FIELD OF THE INVENTION

The present invention relates generally to securing devices. More specifically, the present invention is concerned with a unique rope or strap.

BACKGROUND

Traditionally, ropes and straps have been used to tie items down, often requiring the same to be secured to itself or to another rope or strap. Unfortunately, traditional securing methods, such as knots and the like, have certain limitations. Accordingly, it would be beneficial to have a new rope or strap system that provides unique interfacing options.

SUMMARY

The hook and loop rope of the present invention is configured to facilitate tying objects down without requiring a user to tie a knot in the rope. Instead, the user need only loop the rope through a tiedown (or structural equivalent) prior to engaging a first portion hooks of a first portion of the rope with loops of a second portion of the rope. In some embodiments, depending on the size and weight of the object and the anticipated jostling associated with the same, the object can be safely secured with two feet of overlap of the rope.

The hook and loop rope of the present invention is configured to be moved from a rolled configuration to an unrolled configuration and on to a tie-down configuration. In the rolled configuration, a plurality of hooks associated with a hook side of the rope engage with a plurality of loops associated with a loop side of the rope, thereby retaining the rope in the rolled configuration. In this way, the rope of the present invention provides superior storage capabilities to other ropes that tend to unroll during storage and/or that tend to get knotted up (internally and/or with other ropes or items).

In the unrolled configuration, the plurality of hooks are displaced from the plurality of loops, thereby facilitating engagement of the rope with one or more other object, such as for tying the object down or otherwise securing the object with the rope. In some embodiments, the object includes hooks and/or loops that are configured to engage with the rope. In other embodiments, the object is configured such that the rope can easily slide relative to the object, thereby facilitating repositioning the rope relative to the object, such as when tying the object down, tying the object to another object, untying one or more object, or otherwise engaging and/or disengaging the rope with/from one or more object.

In the tie-down configuration, a first portion of the rope overlaps a second portion of the rope, thereby preventing or otherwise inhibiting movement of the first portion relative to the second portion. In some embodiments, the rope engages with one or more other rope (or other elongated object) so as to further secure an object in place, such as by creating a webbing effect.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

Embodiments of the present invention are described in detail below with reference to the attached drawing figures, wherein.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
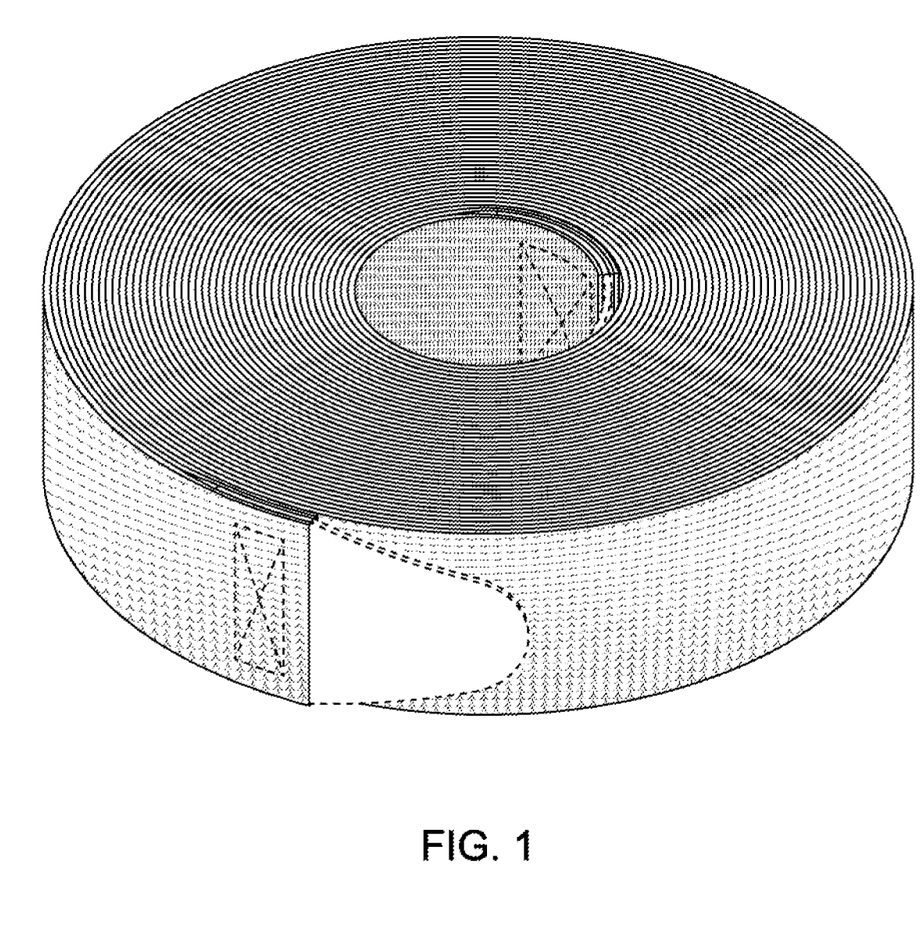
FIG. 1 is an isometric view of a first embodiment of a hook and loop rope of the present invention, shown in a rolled configuration such that a hook side of the rope is exposed.
Figure 2:
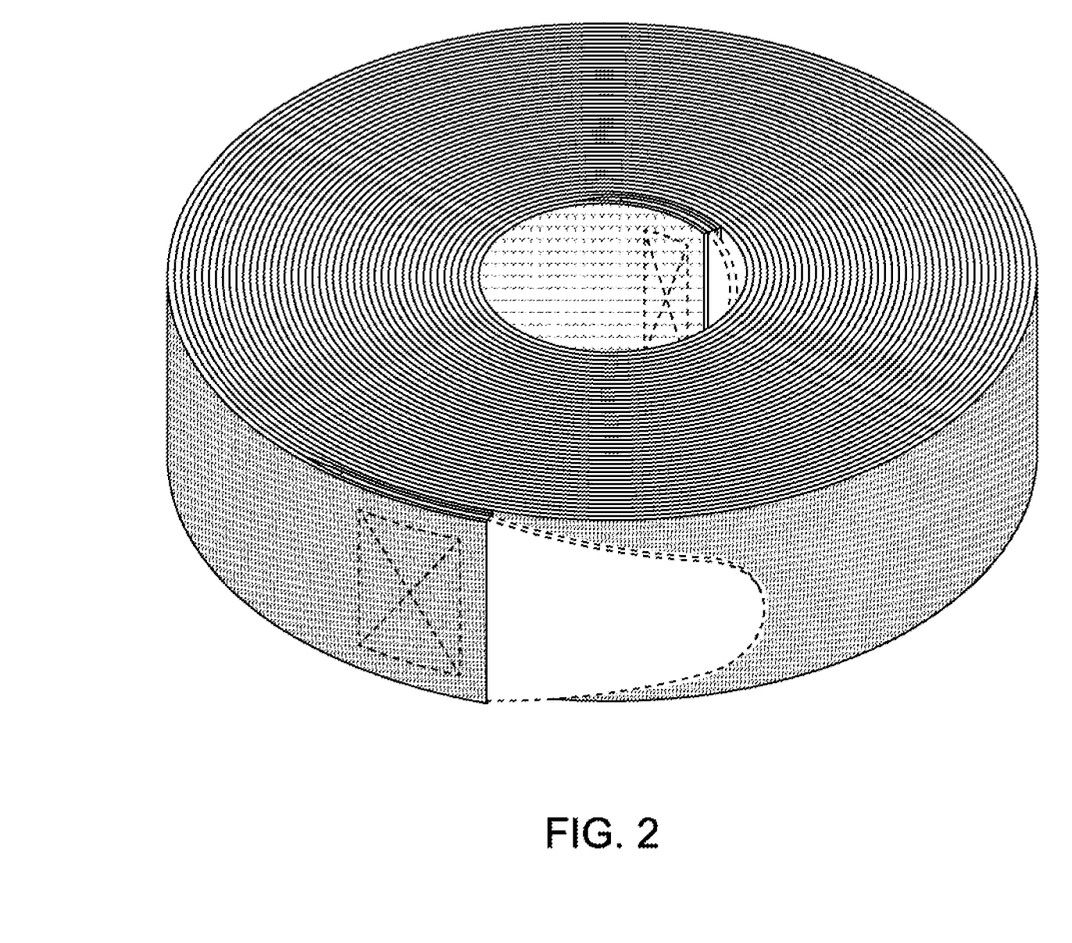
FIG. 2 is an isometric view of the rope of FIG. 1, shown in a rolled configuration such that a loop side of the rope is exposed.
Figure 3:
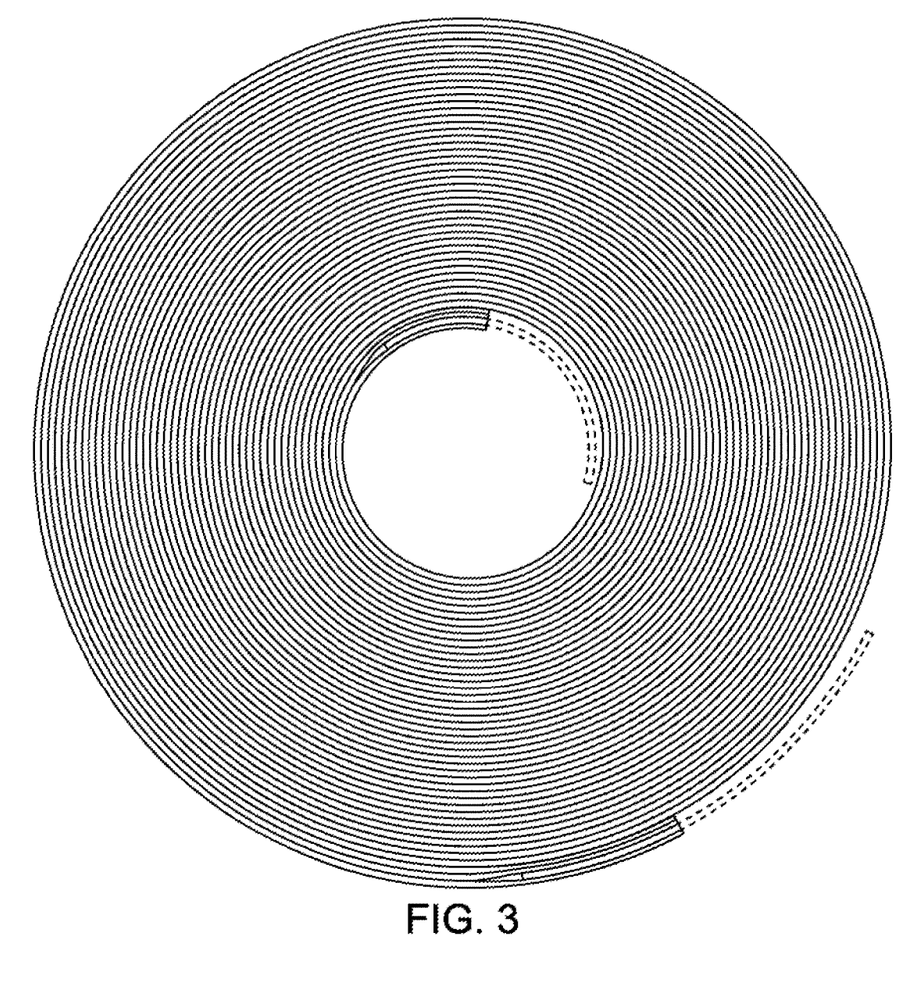
FIG. 3 is a top view of the rope of FIG. 1, the rope shown in the same configuration as shown in FIG. 2.
Figure 4:
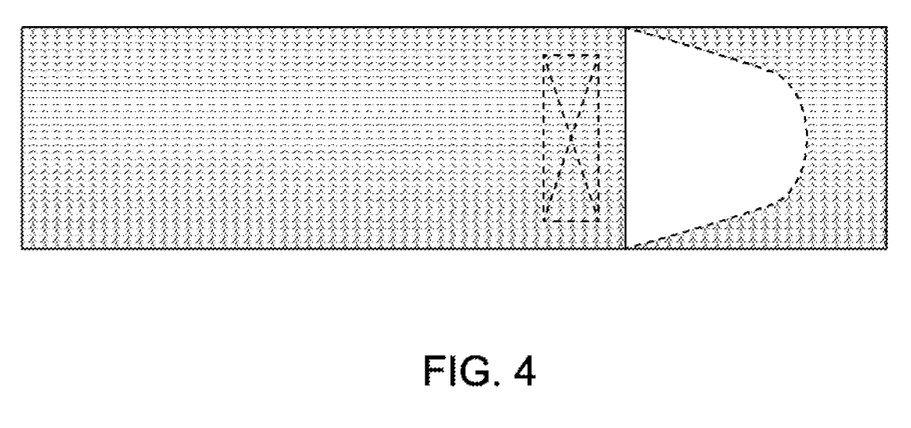
FIG. 4 is a front elevation view of the rope of FIG. 1, the rope shown in the same configuration as shown in FIG. 1.
Figure 5:
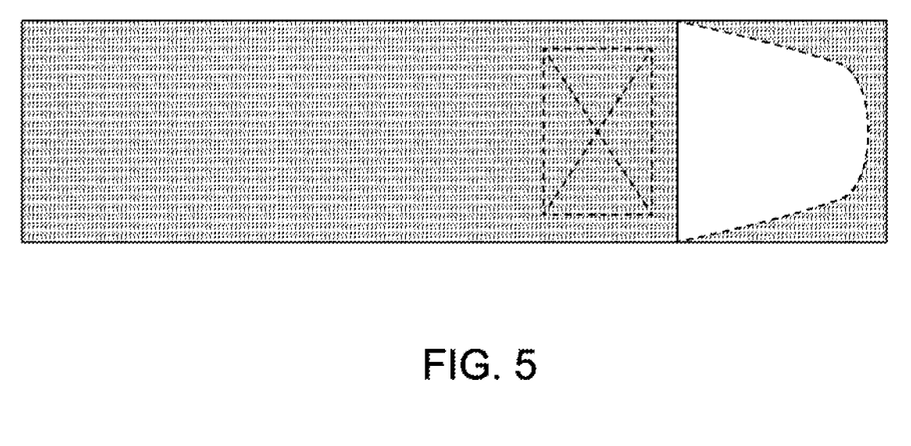
FIG. 5 is a front elevation view of the rope FIG. 1, the rope shown in the same configuration as shown in FIG. 2.
Figure 6:
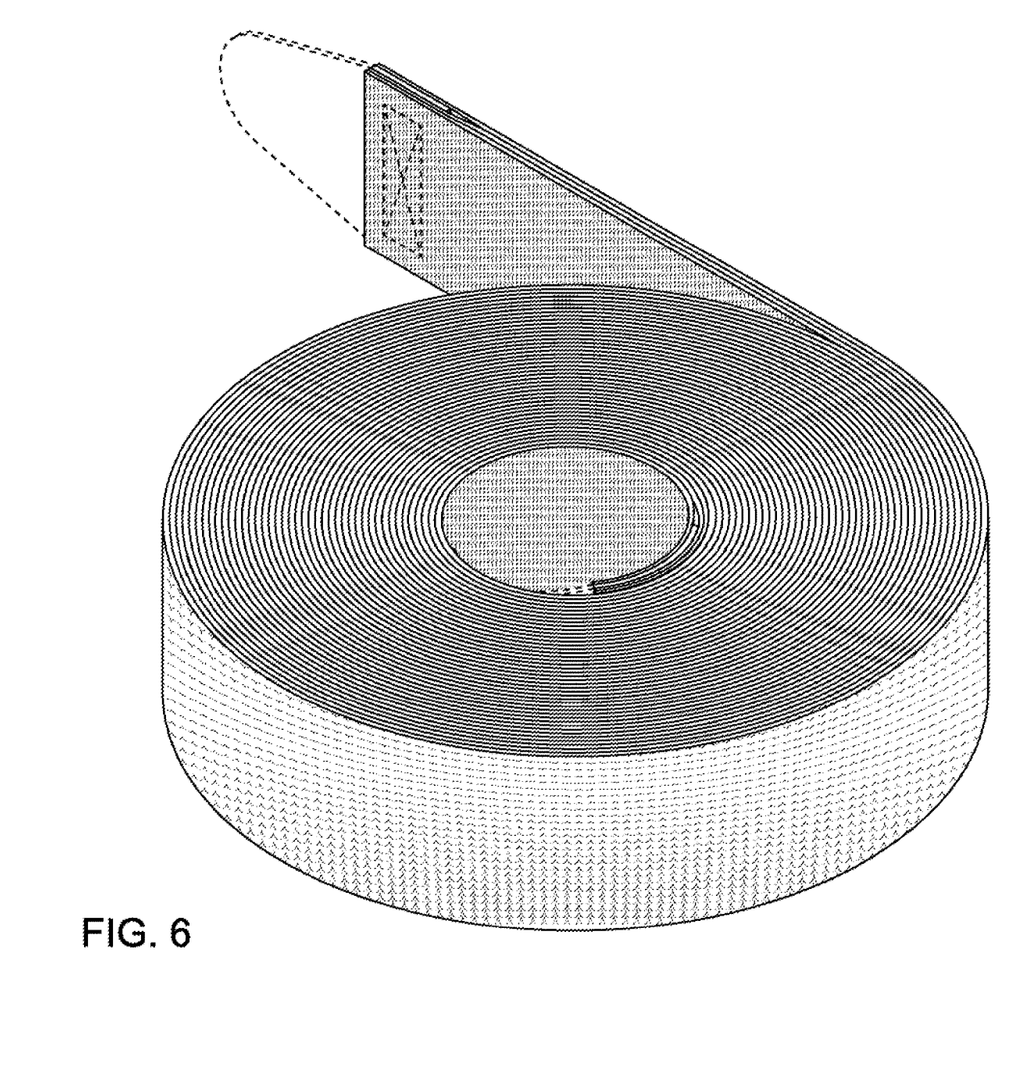
FIG. 6 is an isometric view of the rope of FIG. 1, the rope shown in a partially unrolled configuration.
Figure 7:
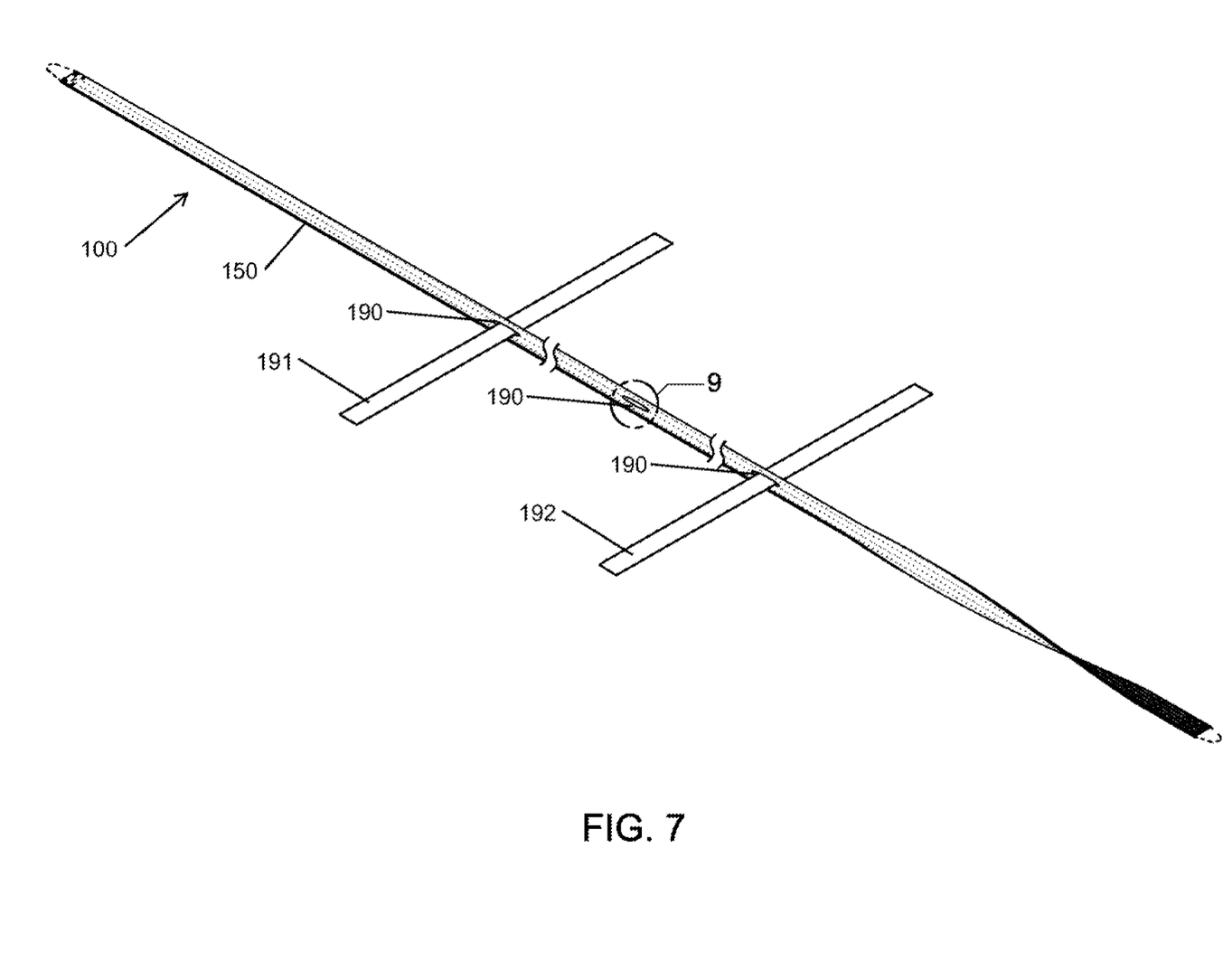
FIG. 7 is an isometric view of three segments of the rope of FIG. 1, each segment defining an opening, the rope shown in an unrolled configuration with a first segment shown in a twisted configuration such that both sides of the first segment are shown.
Figure 12:
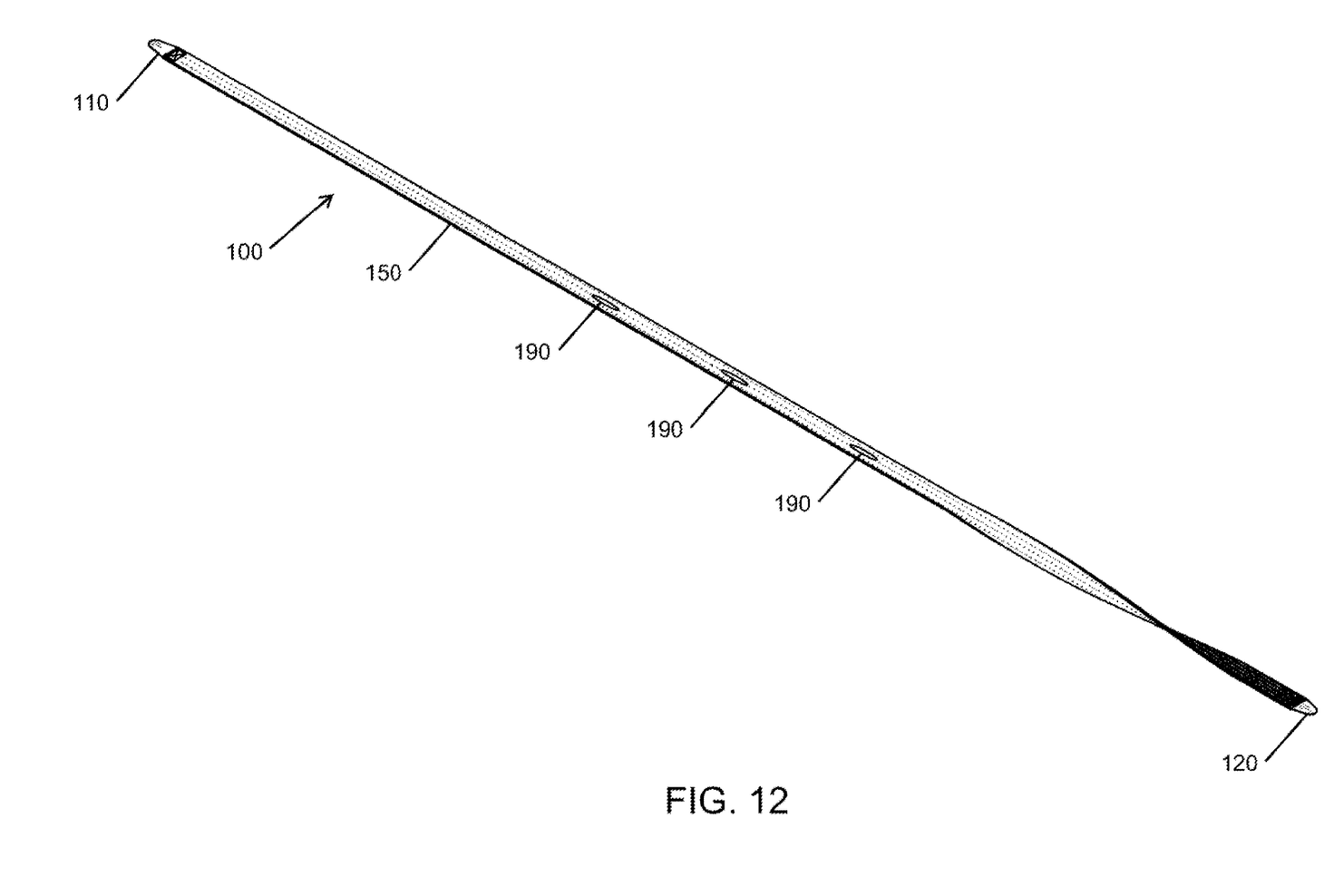
FIG. 12 is an isometric view of an embodiment of the rope of the present invention, the rope shown with a defined length, width, and thickness. It will be appreciated that other embodiments of the rope include a different and/or varying length, width, and/or thickness. The drawing figures do not limit the present invention to the specific embodiments disclosed and described herein. The drawings are not necessarily to scale, emphasis instead being placed upon illustrating the principles of the invention.
Figure 13:
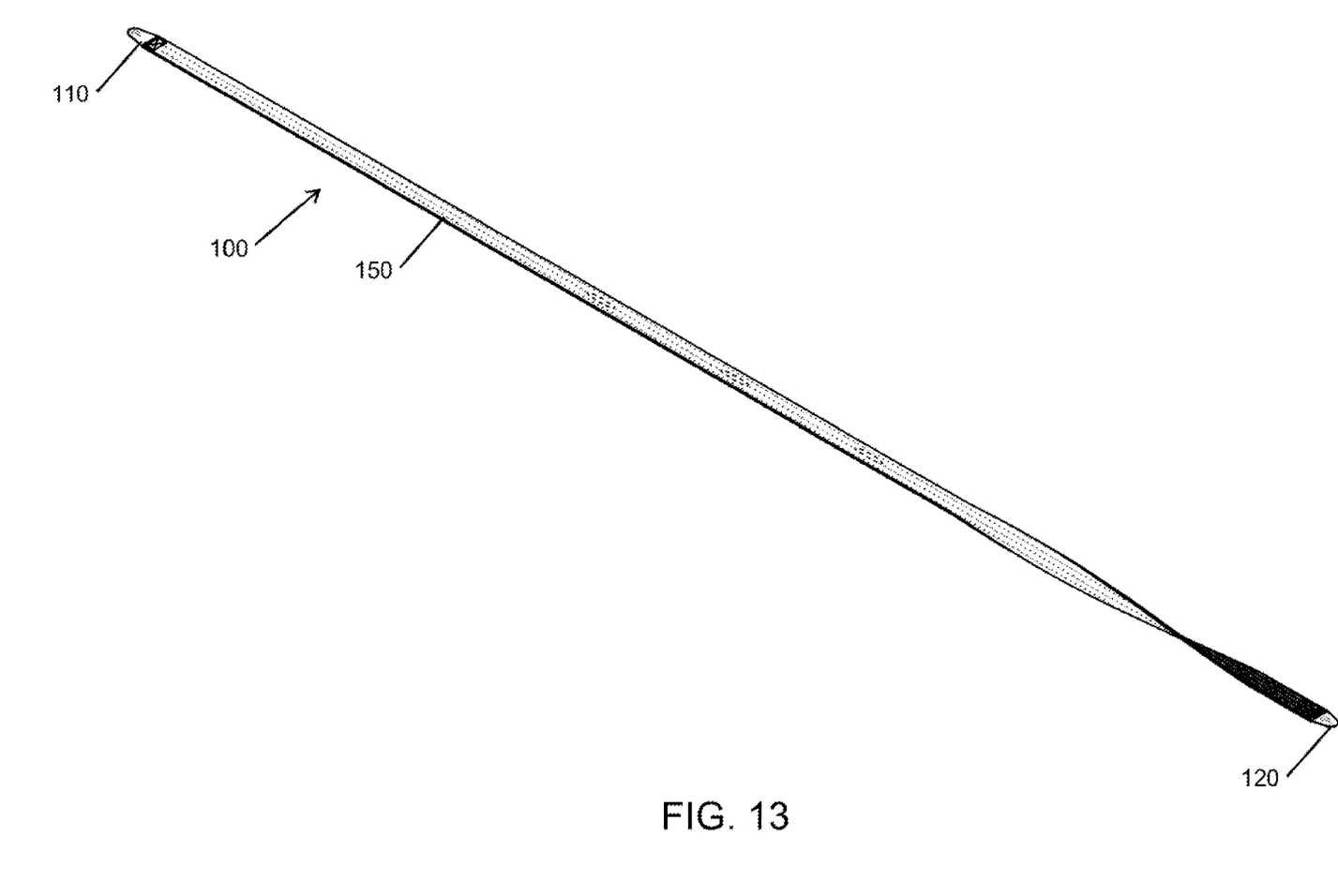
FIG. 13 is an isometric view of an embodiment of the rope of the present invention, the rope shown with a defined length, width, and thickness. It will be appreciated that other embodiments of the rope include a different and/or varying length, width, and/or thickness. The drawing figures do not limit the present invention to the specific embodiments disclosed and described herein. The drawings are not necessarily to scale, emphasis instead being placed upon illustrating the principles of the invention.

Referring to FIGS. 7 and 12, the rope 100 of the present invention includes a primary body 150 and opposed end tabs. The drawings show a first end tab 110 having a first configuration and a second end tab 120 having a second configuration. It will be appreciated that some embodiments of the present invention claim two end tabs having the same configuration as each other (such as the first or second configuration) while other embodiments claim two end tabs having different configurations from each other (such as the first and second configuration).

In some embodiments, the length of the rope is between about 12 feet and about 15 feet. In some embodiments, the length of the rope is up to 25 feet. In some embodiments, the width of the rope is approximately two inches. In some embodiments, the thickness of the rope is approximately 3/16 of an inch. In some embodiments, a primary body 150 of the rope includes three layers, such as a hook layer 151, a loop layer 153, and a center web 152 positioned therebetween. In some embodiments, each layer is approximately 3/16 of an inch thick. In some embodiments, each layer is bonded (such as via ultrasonic welding or the like) to at least one other layer such that stitching along a length of the rope is not required. In some embodiments, the layers are stitched together in one or more local area, such as around an opening 190 and/or at one or more end region (such as in association with securing an end piece to the rope). In some embodiments, the layers are stitched together along a length of the rope.

Figure 8:
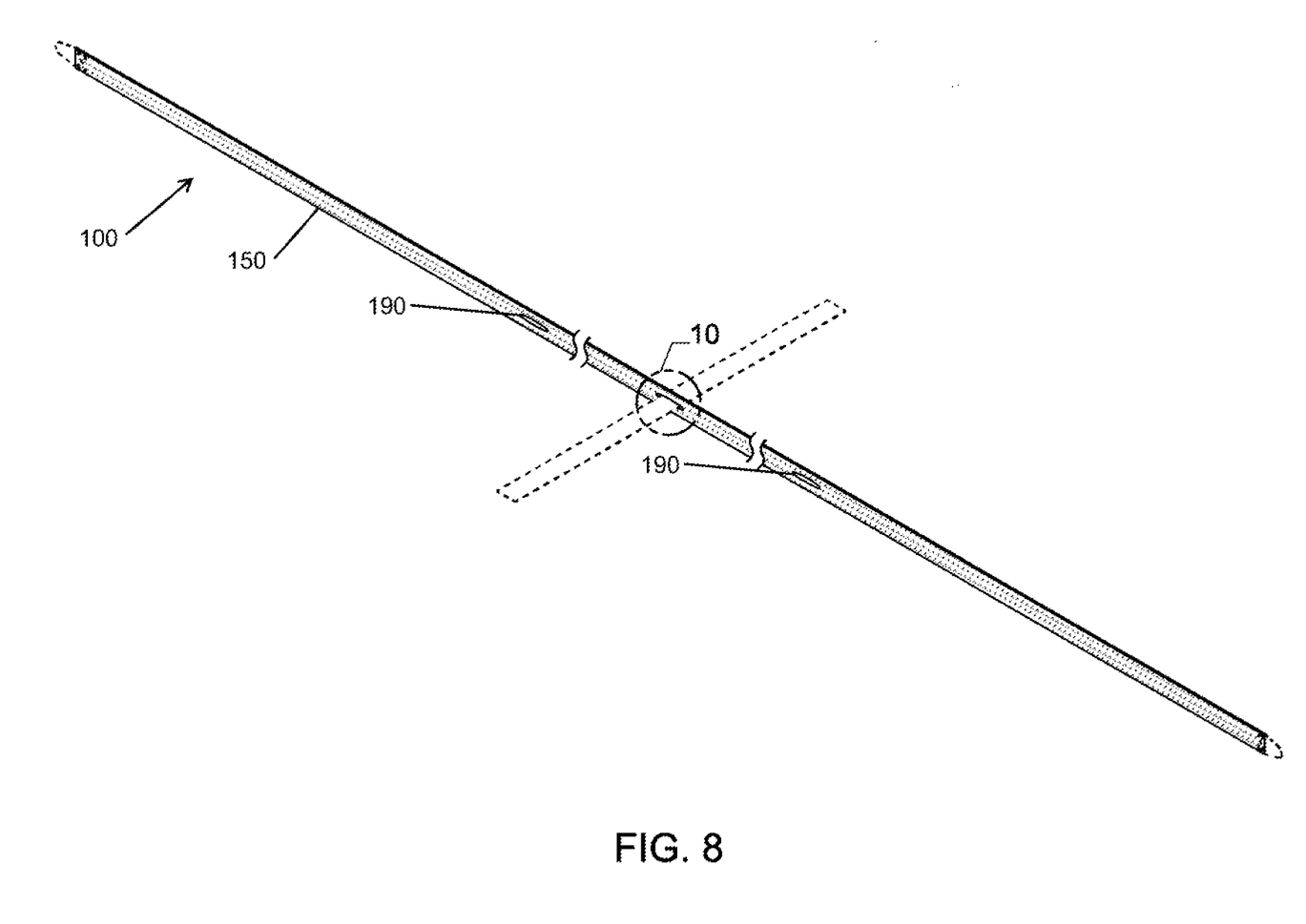
FIG. 8 is an isometric view of three segments of the rope of FIG. 1, each segment defining a respective opening, the rope shown in an unrolled configuration with an elongated object extending through one of the openings, the broken line showing of the elongated object being provided to show environment and forming no part of the claim.
Figure 9:
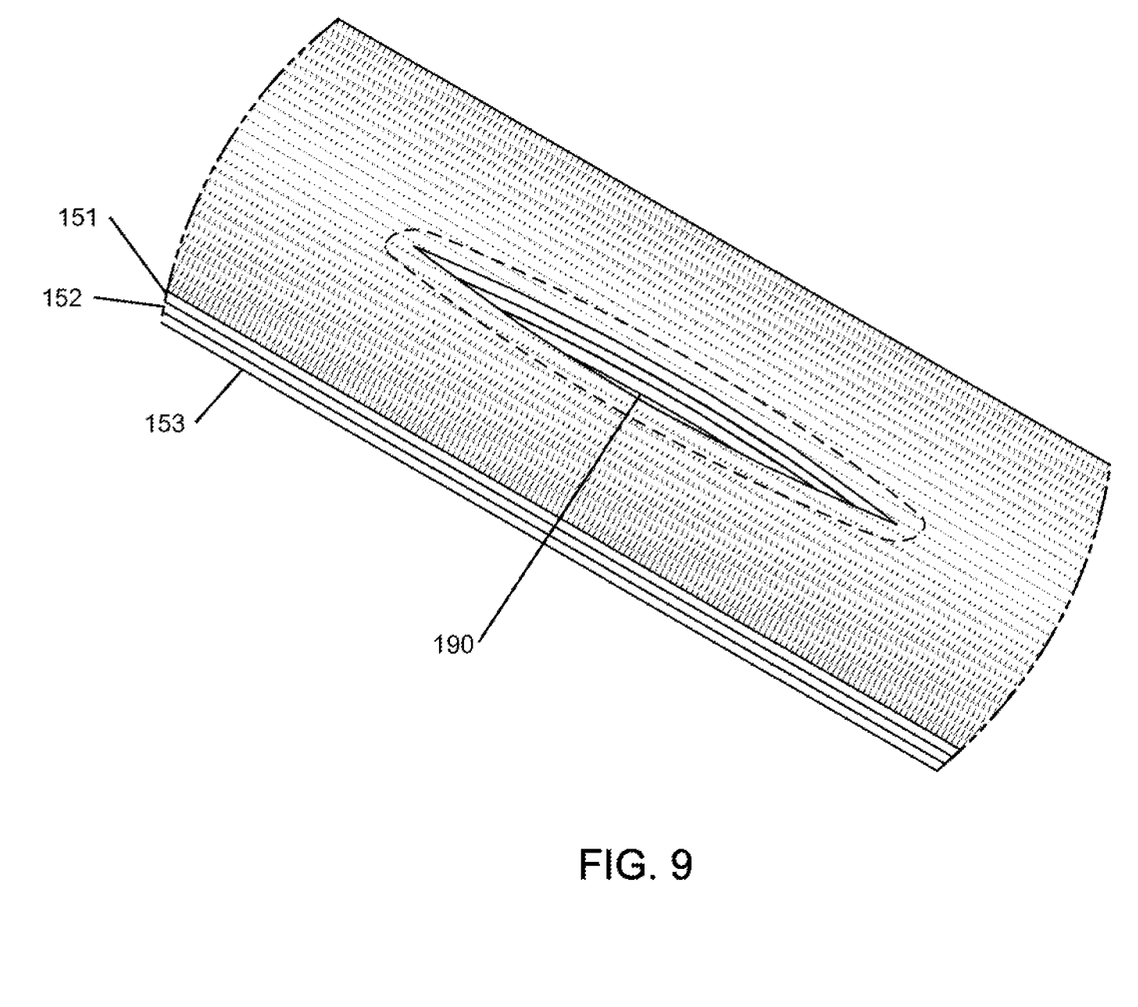
FIG. 9 is a detail view taken from FIG. 7, FIG. 9 showing a first side of an opening, an opposed second side of the opening being a mirror image thereof.
Figure 10:
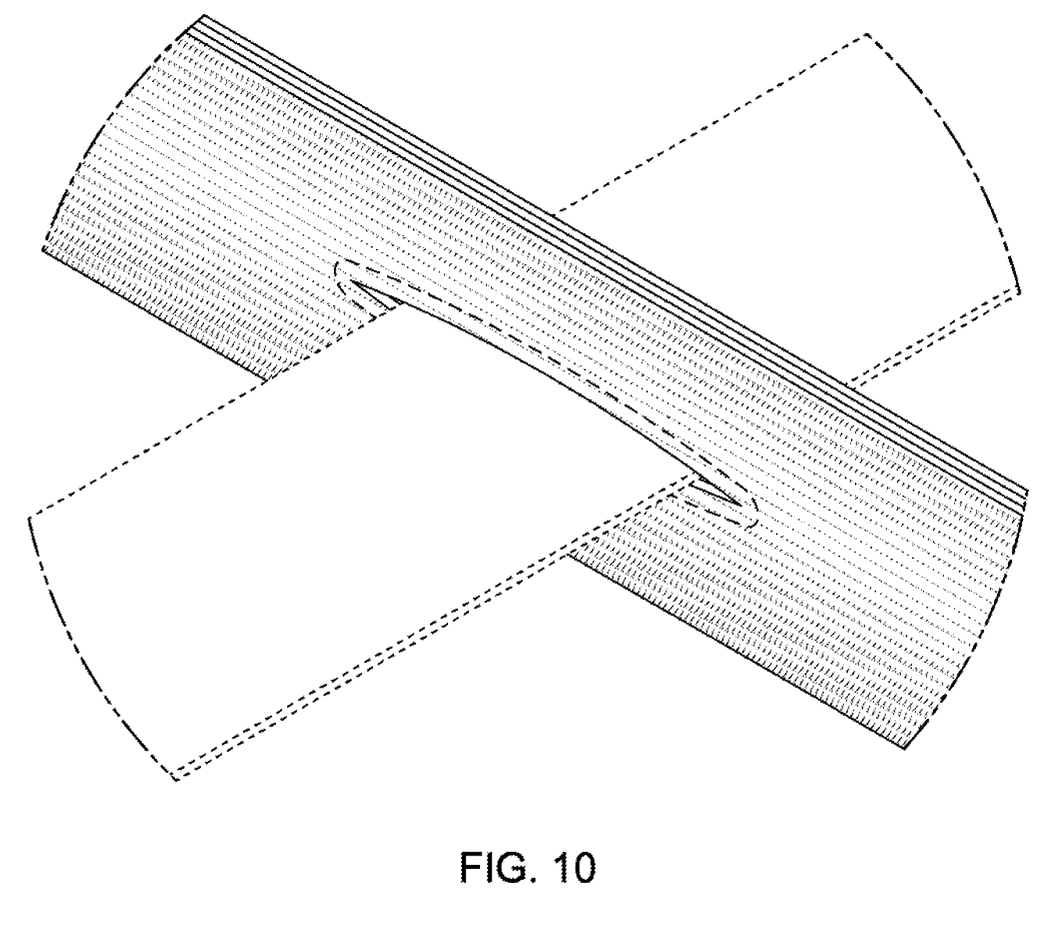
FIG. 10 is a detail view taken from FIG. 8.
Figure 11:
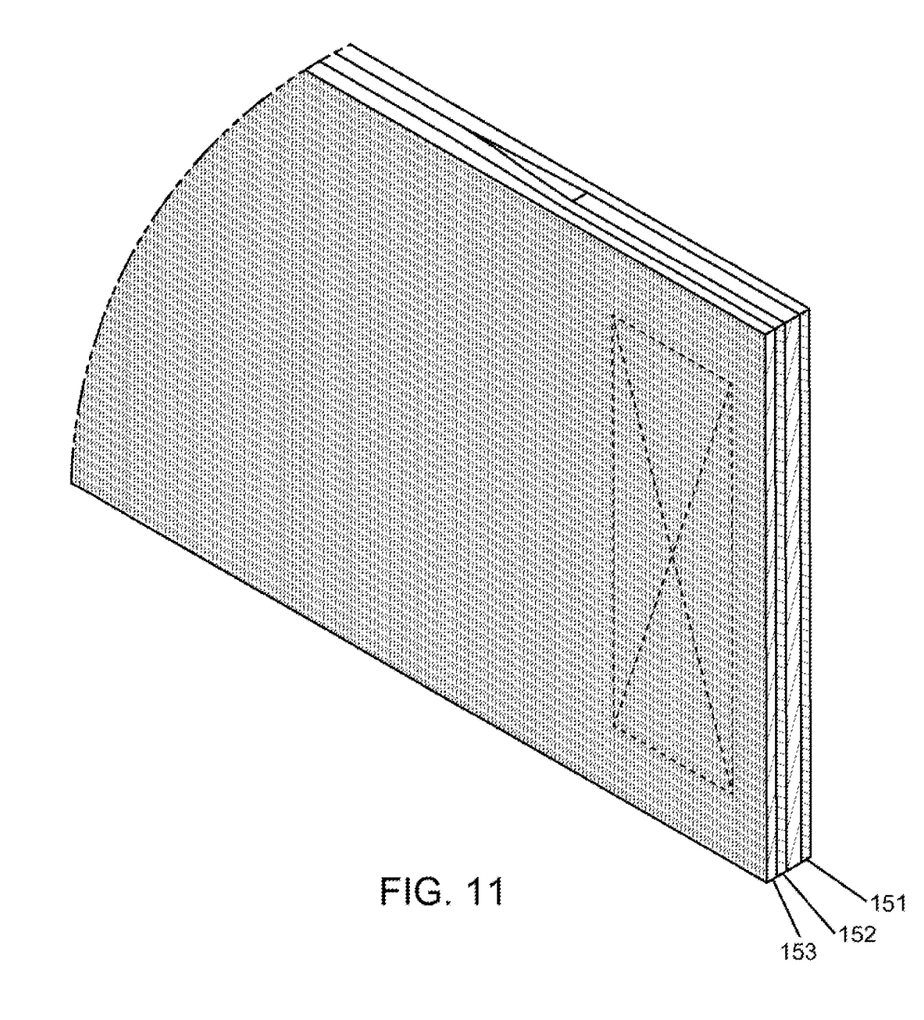
FIG. 11 is a detail cross section showing a proximal end of an end tab positioned adjacent to a center web of the rope, the proximal end of the end tab and the center web of the rope each being positioned between a hook layer and a loop layer of the rope, outer surfaces of the hook layer and the loop layer including a plurality of hooks and loops, respectively, that are configured to engage with each other so as to retain a first portion of the rope to a second portion of the rope and/or for retaining a first portion of the rope to another object (such as another rope) having corresponding hooks and/or loops.

It will be appreciated that some embodiments of the present invention include a positioning of each opening 190 relative to each of the other openings 190 and from each end of the rope, such as the defined positioning shown in FIGS. 7, 8, and 12. It will further be appreciated that some embodiments of the present invention include a different number of openings, different and/or varying positioning of openings, and/or different and/or varying sizes of openings. It will further be appreciated that other embodiments include no openings at all. It will also be appreciated from the drawings that at least some embodiments of the openings 190 are slits that are configured to receive an elongated member, such as another rope. Referring to FIG. 7, some ropes 100 of the present invention include three openings (such as first, second, and third openings), each of which is capable of receiving an elongated member, such as the first 191 and second 192 elongated members shown received by first and third openings 190, respectively, of the rope 100. It will be appreciated that a variety of configurations and combinations are possible.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A first rope, the first rope comprising:
    a main body having opposed top and bottom layers, the top layer being a hook layer having a plurality of hooks, and the bottom layer being a loop layer having a plurality of loops;
    a first end tab extending from a first end of the main body of the first rope; and
    a second end tab extending from a second end of the main body of the first rope,
    wherein said main body defines a first slot extending through the first and second layers, the first slot being configured for receiving an elongated member,
    wherein said plurality of hooks of said hook layer are configured to be selectively engaged with said plurality of loops of said loop layer, thereby securing the first rope in a first configuration,
    wherein said plurality of hooks of said hook layer are configured to be selectively engaged with a plurality of loops associated with a second rope, thereby restricting movement of the second rope relative to the first rope,
wherein the first slot is configured to receive a main body of the second rope, thereby facilitating sliding engagement of the second rope with respect to the first rope, and
wherein the main body defines a plurality of slots spaced along the length of said main body, wherein said first slot is one of said plurality of slots, and wherein each of said plurality of slots is configured to receive a main body of a respective rope of a plurality of other ropes, thereby facilitating sliding engagement of each rope of the plurality of other ropes with respect to the first rope.

2. The first rope of claim 1, wherein said first end tab has a first configuration and said second end tab has a second configuration.

3. The first rope of claim 1, wherein said first and second end tabs have the same configuration.

4. The first rope of claim 1, further comprising a center web positioned between the first and second layers.

5. The first rope of claim 1, wherein the plurality of slots further comprises a second slot, the second slot being positioned first, second, and third longitudinal distances from the first end tab, the second end tab, and the first slot, respectively, wherein the second longitudinal distance is greater than the first longitudinal distance, and wherein each of the first and second longitudinal distances is greater than the third longitudinal distances.

6. The first rope of claim 5, wherein the plurality of slots further comprises a third slot, the third slot being positioned fourth, fifth, and sixth longitudinal distances from the first end tab, the second end tab, and the first slot, respectively, wherein the fourth longitudinal distance is greater than the fifth longitudinal distance, and wherein each of the fourth and fifth longitudinal distances is greater than the sixth longitudinal distances.

7. The first rope of claim 6, wherein the third slot is positioned a seventh longitudinal distances from the second slot, wherein each of the first and fifth longitudinal distances is greater than the seventh longitudinal distance.

8. The first rope of claim 6, wherein the third slot is positioned a seventh longitudinal distances from the second slot, wherein each of the first and fifth longitudinal distances is greater than the seventh longitudinal distance.

9. The first rope of claim 5, wherein the plurality of slots further comprises a third slot, the third slot being positioned fourth, fifth, and sixth longitudinal distances from the end of said elongated primary body, the second end of said elongated primary body, and the first slot, respectively, wherein the fourth longitudinal distance is greater than the fifth longitudinal distance, and wherein each of the fourth and fifth longitudinal distances is greater than the sixth longitudinal distances.

10. A rope assembly comprising first, second, and third ropes, each of said first and second ropes comprising:
an elongated primary body including opposed first and second layers, said first layer being a hook layer having a plurality of hooks, and said second layer being a loop layer having a plurality of loops,
wherein said primary body of said first rope defines a first slot extending through the first and second layers of said first rope, said first slot of said first rope being configured for receiving said primary body of said second rope, thereby facilitating slidable engagement of said second rope with respect to said first rope,
wherein said primary body of said first rope defines a plurality of slots spaced along the length of said primary body, said plurality of slots comprising said first slot and a second slot, and
wherein said second slot is configured to receive a primary body of said third rope, thereby facilitating sliding engagement of said third rope with respect to said first rope.

11. The rope assembly of claim 10, wherein said plurality of hooks of said first rope are configured to be selectively engaged with said plurality of loops of said second rope, thereby moving the rope to a first configuration.

12. The rope assembly of claim 10, wherein said plurality of hooks of said first rope are configured to be selectively engaged with said plurality of loops of said second rope, thereby restricting movement of said second rope relative to said first rope.

13. The rope assembly of claim 12, wherein each of said first and second ropes further comprises first and second end tabs extending from respective first and second ends of respective primary bodies.

14. The rope assembly of claim 10, wherein the second slot is positioned first, second, and third longitudinal distances from a first end of said elongated primary body, a second end of said elongated primary body, and the first slot, respectively, wherein the second longitudinal distance is greater than the first longitudinal distance, and wherein each of the first and second longitudinal distances is greater than the third longitudinal distances.

15. A hook and loop rope comprising:
a primary body comprising:
  a hook layer including an outer hook layer surface and an inner hook layer surface said outer hook layer surface being associated with a plurality of hooks;
  a loop layer including an outer loop layer surface and an inner loop layer surface, said outer loop layer surface being associated with a plurality of loops;
  a center web positioned between the inner hook layer surface and inner loop layer surface;
a first end tab associated with a first end of said primary body;
a second end tab associated with a second end of said primary body;
a first opening configured to receive an elongated object, the first opening being generally centered along a longitudinal axis of the hook and loop rope; and
a plurality of openings spaced along the length of said primary body, the plurality of openings comprising:
  the first opening;
  a second opening positioned between the first opening and the first end tab; and
  a third opening positioned between the first opening and the second end tab,
wherein the longitudinal distance between the first end tab and the second opening is greater than a longitudinal distance between the second opening and the first opening, and
wherein a longitudinal distance between the second end tab and the third opening is greater than a longitudinal distance between the third opening and the first opening.

* * * * *

UNITED STATES PATENT AND TRADEMARK OFFICE
CERTIFICATE OF CORRECTION

| | | |
|---|---|---|
| PATENT NO. | : 12,398,781 B2 | Page 1 of 1 |
| APPLICATION NO. | : 18/109245 | |
| DATED | : August 26, 2025 | |
| INVENTOR(S) | : Stoops | |

It is certified that error appears in the above-identified patent and that said Letters Patent is hereby corrected as shown below:

In the Specification

In Column 2, Line 33, delete "rope" and insert -- rope of --, therefor.

In Column 4, Line 30, delete "with in" and insert -- within --, therefor.

In the Claims

In Column 6, Claim 15, Line 34, delete "surface" and insert -- surface, --, therefor.

Signed and Sealed this
Twenty-first Day of October, 2025

John A. Squires
*Director of the United States Patent and Trademark Office*